United States Patent
Wu et al.

(10) Patent No.: US 10,037,107 B2
(45) Date of Patent: Jul. 31, 2018

(54) OPTICAL TOUCH DEVICE AND SENSING METHOD THEREOF

(71) Applicant: Wistron Corporation, New Taipei (TW)

(72) Inventors: Bo-Yi Wu, New Taipei (TW); Yu-Yen Chen, New Taipei (TW); Kuo-Hsien Lu, New Taipei (TW); Wei-Kuo Kan, New Taipei (TW); Kuo-Ting Huang, New Taipei (TW); Ching-An Cho, New Taipei (TW); Chih-Hao Chiu, New Taipei (TW); Chan-Hsuan Yu, New Taipei (TW); You-Jyun Syu, New Taipei (TW)

(73) Assignee: Wistron Corporation, New Taipei (TW)

( * ) Notice: Subject to any disclaimer, the term of this patent is extended or adjusted under 35 U.S.C. 154(b) by 249 days.

(21) Appl. No.: 14/821,810

(22) Filed: Aug. 10, 2015

(65) Prior Publication Data
US 2016/0334937 A1 Nov. 17, 2016

(30) Foreign Application Priority Data
May 12, 2015 (TW) .............................. 104115049 A (51) Int. Cl.
G06F 3/042 (2006.01)
G06F 3/041 (2006.01)
(52) U.S. Cl.
CPC .......... *G06F 3/0428* (2013.01); *G06F 3/0416* (2013.01)

(58) Field of Classification Search
CPC .............................. G06F 3/0428; G06F 3/0416
See application file for complete search history.

(56) References Cited

U.S. PATENT DOCUMENTS

| | | | | |
|---|---|---|---|---|
| 2011/0080363 A1* | 4/2011 | Kao | ...................... | G06F 3/0428 345/173 |
| 2011/0157050 A1* | 6/2011 | Jang | ...................... | G06F 3/0428 345/173 |
| 2011/0205189 A1* | 8/2011 | Newton | ................ | G06F 3/0428 345/175 |

* cited by examiner

Primary Examiner — Aneeta Yodichkas
(74) Attorney, Agent, or Firm — JCIPRNET (57) ABSTRACT

An optical touch device and a sensing method thereof are provided. The optical touch device includes a plurality of optical sensors and a processing unit. The optical sensors are arranged around a touch plane and are spaced from each other. The two adjacent optical sensors located at one side of the touch plane are defined as one set of an optical sensing module, such that the optical sensors are paired to form multiple sets of the optical sensing modules. The processing unit generates a plurality of touch coordinates data corresponding to the plurality sets of the optical sensing modules according to the optical touch data, and determines whether the touch coordinates data corresponding to each set of the optical sensing modules is in at least one touch-excluded area corresponding to each set of the optical sensing modules, and respectively excludes the touch coordinates data in the touch-excluded area.

12 Claims, 3 Drawing Sheets

FIG. 1

S210 — Providing a plurality of optical sensors, and pairing the optical sensors to form multiple sets of the optical sensing modules S220 — Obtaining a plurality of optical touch data corresponding to the optical sensors S230 — Generating a plurality of touch coordinates data corresponding to the plurality sets of the optical sensing modules according to the optical touch data S240 — Determining whether the touch coordinates data corresponding to each set of the optical sensing modules is in at least one touch-excluded area corresponding to each set of the optical sensing modules S250 (Yes) — Excluding the touch coordinates data in the at least one touch-excluded area corresponding to each set of the optical sensing modules S260 — Calculating touch coordinates of the at least one touch object according to the remained touch coordinates data

OPTICAL TOUCH DEVICE AND SENSING METHOD THEREOF

CROSS-REFERENCE TO RELATED APPLICATION

This application claims the priority benefit of Taiwan application serial no. 104115049, filed on May 12, 2015. The entirety of the above-mentioned patent application is hereby incorporated by reference herein and made a part of this specification.

BACKGROUND OF THE INVENTION

Field of the Invention

The invention relates to a touch sensing technique, and particularly relates to an optical touch sensing device having a plurality of optical sensing modules and a sensing method thereof.

Description of Related Art

Electronic devices or display screens having a touch function have gradually become a development trend of today's technology. However, limited by manufacturing cost and a touch effect, capacitive or resistive touch screens are only adapted to small and middle-size devices such as mobile phones, tablet personal computers (PCs), notebooks, and all-in-one (AIO) computers, and are not suitable for being applied to large-size devices due to reasons of cost, reliability, etc. Along with development of photosensitive elements, large-size screens (for example, electronic whiteboards or advertising billboards) generally adopt an optical touch technique to implement a touch function, and a reason thereof is that the optical touch technique not only results in a low manufacturing cost, a touch accuracy thereof is also improved along with development of technology, and along with advance of identification algorithm, multi-touch operations can be effectively detected. An application principle of the optical touch technique is to detect a position of a finger by detecting a light shielded or reflected by a touch object, and convert such position into a position of the touch object on the screen to implement the touch function.

The present optical touch technique generally adopts a touch device composed of two optical sensing modules (for example, optical cameras) and a processing unit (for example, a central processing unit (CPU), a field programmable gate array (FPGA), etc.) applied therein to detect the touch object. However, when the number of the touch objects is greater than two, it is complicated for the processing unit to identify and calculate positions of touch points, and an error or an interference is liable to be occurred, for example, the so-called "ghost points problem". For example, when two touch objects are simultaneously located in a touch area, four intersections are generated under a function that the two optical cameras cross-capture images, in which two intersections are real touch points and the other two intersections are ghost points without the touch object. Now, the processing unit further determines and selects the touch points according to various physical phenomenon or variations (for example, the previously detected touch points).

A current solution is to additionally add the touch devices at different locations of the touch area to assist determining the touch points and filtering the ghost points. However, when the touch devices are increased, the method for determining the touch points becomes more complicated, and a required computation amount is also increased. On the other hand, the touch device composed of more than two optical sensing modules also has areas with less sensing accuracy, for example, when the position of the touch object is very close to a connection line between the two optical sensing modules, the intersection sensed by the touch device is inaccurate. Alternatively, limited by an image resolution of the optical sensing modules, the touch device cannot accurately identify or determine the real touch points and ghost points located beyond a certain large distance or within a certain angle range, which may lead to a wrong judgement for the real touch points.

SUMMARY OF THE INVENTION

The invention is directed to an optical touch device and a sensing method thereof, where the optical touch device senses a touch object through a plurality of sets of optical sensing modules composed of a plurality of optical sensors paired in pairs, and excludes coordinates data with lower reliability detected by each set of the optical sensing modules, so as to simplify a flow of determining touch points.

The invention provides an optical touch device including a plurality of optical sensors and a processing unit. The optical sensors are arranged around a touch plane and are spaced from each other. The optical sensors respectively generate a plurality of optical touch data according to at least one touch object on the touch plane. The two adjacent optical sensors located at one side of the touch plane are defined as one set of an optical sensing module, such that the optical sensors are paired to form multiple sets of the optical sensing modules. The processing unit is coupled to the optical sensors. The processing unit obtains the optical touch data corresponding to the optical sensors, and generates a plurality of touch coordinates data corresponding to the plurality sets of the optical sensing modules according to the optical touch data, and determines whether the touch coordinates data corresponding to each set of the optical sensing modules is in at least one touch-excluded area corresponding to each set of the optical sensing modules, and respectively excludes the touch coordinates data in the at least one touch-excluded area corresponding to each set of the optical sensing modules. Moreover, the processing unit calculates touch coordinates of the at least one touch object according to the remained touch coordinates data.

According to another aspect, the invention provides an optical touch sensing method, which includes following steps. A plurality of optical sensors are provided, where the optical sensors are arranged around a touch plane and are spaced from each other, and the two adjacent optical sensors located at one side of the touch plane are defined as one set of an optical sensing module, such that the optical sensors are paired to form multiple sets of the optical sensing modules. A plurality of optical touch data corresponding to the optical sensors are obtained, where the optical sensors respectively generate the corresponding optical touch data according to at least one touch object on the touch plane. A plurality of touch coordinates data corresponding to the plurality sets of the optical sensing modules are generated according to the optical touch data. It is determined whether the touch coordinates data corresponding to each set of the optical sensing modules is in at least one touch-excluded area corresponding to each set of the optical sensing modules. The touch coordinates data in the at least one touch-excluded area corresponding to each set of the optical sensing modules is excluded. Moreover, touch coordinates of the at least one touch object are calculated according to the remained touch coordinates data.

According to the above description, the optical touch device of the invention senses the touch object through a plurality sets of the optical sensing modules composed of a plurality of optical sensors, and the touch-excluded area with lower reliability is set according to a position of each set of the optical sensing modules. When the coordinates data generated by each set of the optical sensing modules is in the touch-excluded area with lower reliability, the coordinates data is excluded. Since the optical touch device has a plurality sets of optical sensing modules, data of each set of the optical sensing modules with lower reliability can be directly decreased, so as to simplify a determination process of the touch points, by which the coordinates data with lower reliability is not considered for determining the touch points, so as to increase determination accuracy.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to accurately detect a touch object by using an optical touch technique, an optical touch device of the invention is configured with a plurality sets of optical sensing modules, and a touch-excluded area with lower reliability is set according to a position of each set of the optical sensing modules. Since touch areas of the optical sensing modules are overlapped to each other, when a part of coordinates data generated by one set of the optical sensing module is in the touch-excluded area with lower reliability, the part of coordinates data in the touch-excluded area with lower reliability is excluded, and the coordinate data with higher reliability is retained. In this way, the optical touch device of the invention can exclude the coordinates data with lower reliability to decrease the number of coordinates data obtained when each touch point is sensed, so as to simplify a determination process of the touch points and increase determination accuracy. Embodiments are provided below for describing the invention in detail.

Figure 1:
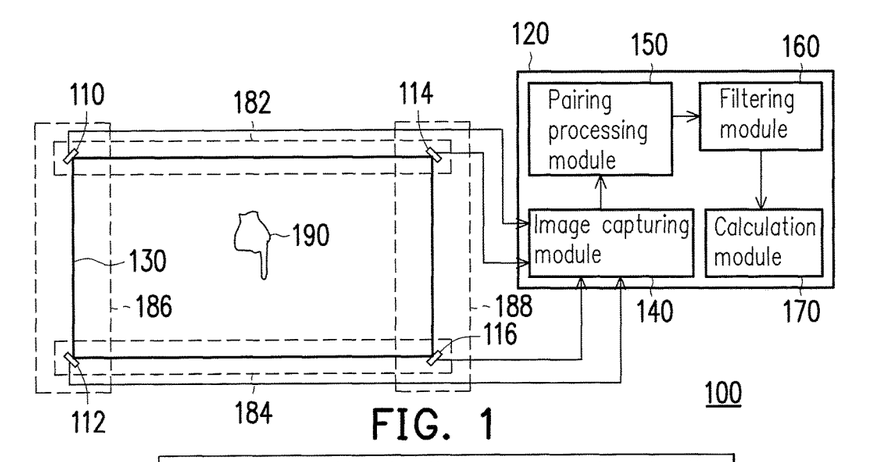
FIG. 1 is a schematic diagram of an optical touch device according to an embodiment of the invention.

FIG. 1 is a schematic diagram of an optical touch device 100 according to an embodiment of the invention. The optical touch device 100 mainly includes a plurality of light engine modules 110, 112, 114 and 116 and a processing unit 120. Each of the light engine modules 110-116 has a light source and an optical sensor. The light source is used for producing a light such as an infrared light, an ultraviolet light or a visible light, etc., and the optical sensor is used for detecting a brightness of the light directly or indirectly (for example, the light is reflected or shielded) produced by the light source. Those skilled in the art can select to use suitable light sources, optical sensors and a light detecting pattern (for example, a reflective or shielding type light detecting pattern) according to an actual requirement. In the present embodiment, the optical sensors can be optical camera lenses, and the light sources are respectively disposed beside each of the optical sensors to form the optical engine modules 110, 112, 114 and 116. On the other hand, if the optical touch device 100 applies a light-shielding touch technique, reflecting bars are added to four sides of a touch plane 130 to reflect the lights produced by each of the light sources to the optical sensors, and a position of a touch object 190 is determined according to whether the lights are shielded. The touch object 190 of the present embodiment can be a finger, a stylus, etc. In the present embodiment, the optical touch device 100 may support single-touch and multi-touch.

The optical engine modules 110, 112, 114 and 116 are respectively disposed at vertexes of the touch plane 130 with a shape of polygon. In the present embodiment, the touch plane 130 is a rectangle, so that the optical engine modules 110, 112, 114 and 116 are respectively disposed at four corners of the rectangular touch plane 130. In other words, the optical engine modules 110, 112, 114 and 116 are respectively disposed at four corners of the rectangle to define the touch plane 130. Based on the optical touch technique, the touch plane 130 of the optical touch device 100 can be a display screen or any plane, and the touch plane 130 is not limited to be the display screen (for example, a liquid crystal screen). Moreover, the touch plane 130 can also be a polygon with other shapes, for example, a pentagon or a hexagon, and the number of the optical engine modules can be increased to the number of the vertexes of the polygon, so as to implement the present embodiment of the invention.

The processor 120 can be an entitative computation processing equipment in the optical touch device, for example, one of a central processing unit (CPU), a processing chip, an advanced RISC machine (ARM) chip or a combination thereof. The processing unit 120 can be a single chip, or a combination of a plurality of chips. The processing unit 120 can be used in collaboration with a volatile or non-volatile memory to implement various functions of the present embodiment of the invention. In the present embodiment, the processing unit 120 can execute at least following hardware modules, software modules or firmware modules to implement the present embodiment of the invention: an image capturing module 140, a pairing processing module 150, a filtering module 160 and a calculation module 170. The image capturing module 140 is coupled to the optical sensors of the optical engine modules 110, 112, 114 and 116, the pairing processing module 150 is coupled to the image capturing module 140, the filtering module 160 is coupled to the pairing processing module 150, and the calculation module 170 is coupled to the filtering module 160. The present embodiment of the invention is described below with reference of the above modules of the processing unit 120.

Figure 2:
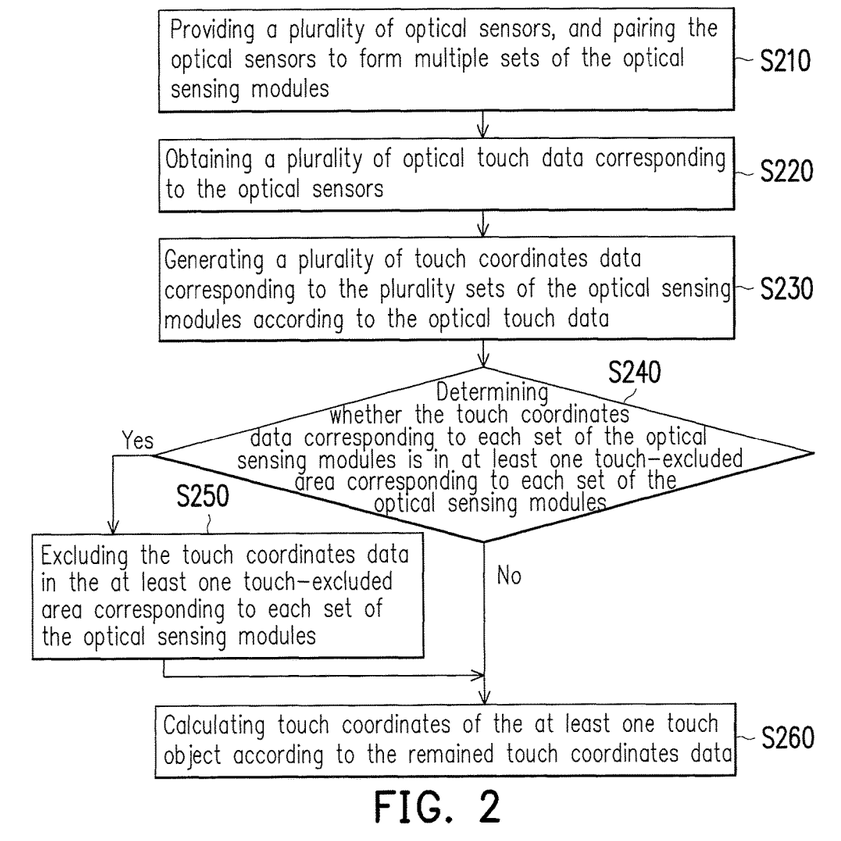
FIG. 2 is a flowchart illustrating an optical touch sensing method according to an embodiment of the invention.

FIG. 2 is a flowchart illustrating an optical touch sensing method according to an embodiment of the invention, which is adapted to the optical touch device 100 of FIG. 1. Referring to FIG. 1 and FIG. 2, in step S210, the optical touch device 100 and a plurality of optical sensors in the optical engine modules 110, 112, 114 and 116 are provided, and the optical sensors are paired to form a plurality of optical sensing modules. The optical sensors are respectively arranged around the touch plane and are spaced from each other. In other words, the optical sensors are respectively disposed at the vertexes of the touch plane 130 with a shape of polygon (for example, a rectangle), and the optical sensors are spaced from each other. The optical engine modules 110, 112, 114 and 116 are respectively disposed at four corners of the rectangle. In the present embodiment, the two adjacent optical sensors located at one side of the touch plane are defined as one set of the optical sensing module, such that the optical sensors are paired to form multiple sets of the optical sensing modules. For example, the optical sensors in the optical engine modules 110 and 114 are defined as an optical sensing module 182, the optical sensors in the optical engine modules 112 and 116 are defined as an optical sensing module 184, the optical sensors in the optical engine modules 110 and 112 are defined as an optical sensing module 186, and the optical sensors in the optical engine modules 114 and 116 are defined as an optical sensing module 188. Therefore, the optical sensors form the multiple sets of the optical sensing modules 182, 184, 186 and 188. In this way, the processing unit 120 can generate corresponding touch coordinates data according to the triangulation method and optical touch data sensed by the optical sensors in the optical sensing modules 182, 184, 186 and 188.

Figure 3:
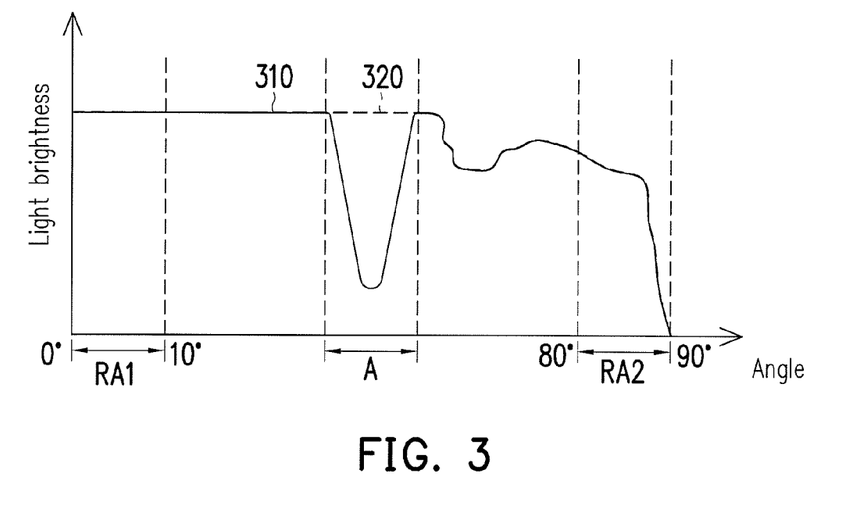
FIG. 3 is a schematic diagram of optical touch data generated by an optical sensor of an optical engine module according to an embodiment of the invention.

In step S220, the image capturing module 140 of the processing unit 120 obtains a plurality of optical touch data from the optical sensors of the optical engine modules 110, 112, 114 and 116. The optical sensors respectively generate the corresponding optical touch data according to the at least one touch object 190 on the touch plane 130. In the present embodiment, the "optical touch data" is light source brightness data generated by the optical sensors, as shown in FIG. 3. FIG. 3 is a schematic diagram of the optical touch data generated by the optical sensor of the optical engine module 112 according to an embodiment of the invention. A horizontal axis in FIG. 3 represents an incident angle of the light sensed by the optical sensor, and a vertical axis represents a brightness of the light sensed by the optical sensor. A solid line 310 represents actually measured light source brightness data, and a dot line 320 represents light source brightness data when the touch object is not applied. In the present embodiment, an incident angle 0 of the light sensed by the optical sensor of the light engine module 112 represents that a light incident direction is on a connection line between the optical engine modules 110 and 112, and an incident angle 90 of the light sensed by the optical sensor of the light engine module 112 represents that a light incident direction is on a connection line between the optical engine modules 112 and 116. FIG. 3 illustrates optical touch data sensed by the optical engine module 112 in case of a single touch object. As shown in the solid line 310 of FIG. 3, the light in a touch area A is shielded, such that the brightness of the light reflected back to the optical sensor is decreased. In this way, the processing unit 120 can learn existence of the touch object on the touch plane 130 according to a plurality of optical touch data generated by the optical engine modules 110, 112, 114 and 116.

In step S230, the pairing processing module 140 in the processing unit 120 generates a plurality of touch coordinates data corresponding to the plurality sets of the optical sensing modules 182, 184, 186 and 188 according to the optical touch data generated by the optical sensors in each set of the optical sensing modules 182, 184, 186 and 188. In detail, each set of the optical sensing modules 182, 184, 186 and 188 respectively corresponds to two optical sensors, so that the pairing processing module 140 in the processing unit 120 generates the touch coordinates data according to the triangulation method and the optical touch data generated by the optical sensors in each set of the optical sensing modules 182, 184, 186 and 188.

Since the optical touch device 100 of the present embodiment has four sets of the optical sensing modules 182, 184, 186 and 188, and each set of the optical sensing modules may generate the touch coordinates data, due to different configuration positions of each set of the optical sensing modules, the touch coordinates data generated by each set of the optical sensing modules for the touch object on the touch plane 130 may have different reliabilities. Therefore, how to adopt and process the touch coordinates data corresponding to the optical sensing modules becomes a problem to be resolved by the embodiment of the invention. In the present embodiment, since the optical sensing modules 182, 184, 186 and 188 are located at different positions of the touch plane 130, and each of the optical sensing modules 182, 184, 186 and 188 has the touch coordinates data sensed in some area may have lower reliability, for example, an area excessively close to the optical sensing modules or excessively far away from the optical sensing modules may have a poor touch object sensing effect. Therefore, in step S240, the filtering module 160 of the processing unit 120 determines whether the touch coordinates data corresponding to each set of the optical sensing modules 182, 184, 186 and 188 is in at least one touch-excluded area corresponding to each set of the optical sensing modules 182, 184, 186 and 188. The touch-excluded areas are in the touch plane 130. If a determination result of the step S240 is affirmative, a step S250 is executed, by which the filtering module 160 in the processing unit 120 excludes the touch coordinates data in the at least one touch-excluded area corresponding to each set of the optical sensing modules. If the determination result of the step S240 is negative, a step S260 is executed, by which the calculation module 170 of the processing unit 120 calculates the touch coordinates of the touch object according to the remained touch coordinates data.

Figure 4:
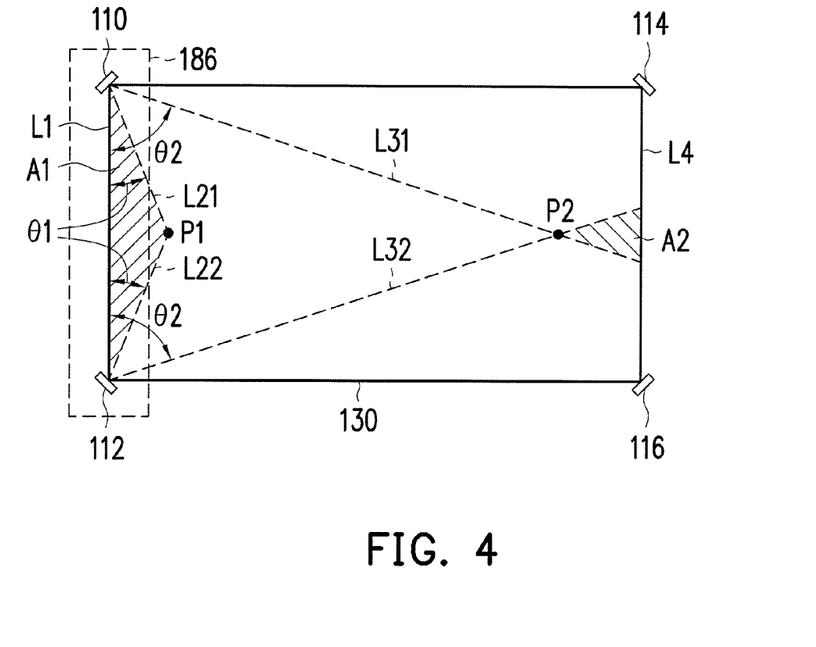
FIG. 4 is a schematic diagram of a near-excluded area A1 and a distant-excluded area A2 corresponding to an optical sensing module 186 on a touch plane according to an embodiment of the invention.

How to set the at least one touch-excluded area corresponding to each set of the optical sensing modules 182, 184, 186 and 188 is described below. In the present embodiment, the touch-excluded area corresponding to each set of the optical sensing modules 182, 184, 186 and 188 may include near-excluded areas close to the optical sensing modules 182, 184, 186 and 188 and/or distant-excluded areas away from the optical sensing modules 182, 184, 186 and 188. The near-excluded areas corresponding to the optical sensing modules 182, 184, 186 and 188 are different, and the distant-excluded areas corresponding to the optical sensing modules 182, 184, 186 and 188 are different. FIG. 4 is a schematic diagram of a near-excluded area A1 and a distant-excluded area A2 corresponding to the optical sensing module 186 on the touch plane 130 according to an embodiment of the invention. Referring to FIG. 4, in the present embodiment of the invention, the near-excluded area A1 corresponding to the optical sensing module 186 is defined as an area encircled by one side L1 of a rectangle formed by the touch plane 130 where each of the optical sensing modules (for example, the optical sensing module 186) is located and two second connection lines L21 and L22 respectively connected between the two optical sensors in the optical sensing module 186 and a near point P1 in the touch plane 130. The near point P1 is located on a middle line of the side L1, and included angles θ1 respectively included between the side L1 and the second connection lines L21 and L22 are equal to a first predetermined angle (for example, 10 degrees). Namely, when the sensed touch coordinates data is located within a range under 10 degrees of the two optical sensors (for example, an angle range RA1 shown in FIG. 3), the touch coordinates data is excluded. The first predetermined angle is obtained according to a statistical method and according to a resolution and/or capability of angle of view of the optical sensor (optical video camera), which can be adjusted by those skilled in the art according to an actual requirement. Moreover, in the aforementioned embodiment, two optical sensors having the same resolution and/or the same capability of angle of view in the optical sensing module 186 are taken as an example for description, so that the two optical sensors have the same first predetermined angle. However, those skilled in the art should understand that when the two optical sensors in the same optical sensing module have different resolutions and/or different capabilities of angle of view, the respective first predetermined angles are probably different. In other words, when the optical sensing module 186 senses the touch object excessively close to the optical sensing module 186 itself (for example, located in the near-excluded area A1), the optical sensing module 186 is not sensitive to a lateral movement of the touch point relative to the optical sensing module 186 on the touch plane 130 because that when the touch point is laterally moved in the near-excluded area A1, a change of the angels between the touch point and the two optical sensors in the optical sensing module 186 is quite small. Therefore, in the present embodiment of the invention, the touch coordinates data in the near-excluded area A1 sensed by the optical sensing module 186 is excluded without processing. On the other hand, the other optical sensing modules (for example, the optical sensing modules 182, 184 located at long sides of the rectangle formed by the touch plane 130) are sensitive to the touch coordinates data in the near-excluded area A1), so that a situation that the touch object cannot be detected by the optical touch device 100 due to exclusion of the touch coordinates data sensed by the optical sensing module 186 in the near-excluded area A1 is avoided.

On the other hand, in the present embodiment of the invention, the distant-excluded area A2 corresponding to the optical sensing module 186 is defined as an area encircled by two third connection lines L31 and L32 connected between the two optical sensors in the optical sensing module 186 and a distant point P2 and another side L4 opposite to the side L1 where the optical sensing module 186 is located. The distant point P2 is located on a middle line of the side L4, and included angles θ2 respectively included between the side L1 and the third connection lines L31 and L32 are equal to a second predetermined angle (for example, 80 degrees). Namely, when the sensed touch coordinates data is located within a range exceeding 80 degrees of the two optical sensors, the touch coordinates data is excluded. The second predetermined angle is also obtained according to a statistical method and according to a resolution of the optical sensor (optical video camera) (similar as that described above, in the present embodiment, the two optical sensors having the same resolution and/or the same capability of angle of view in the optical sensing module 186 are taken as an example for description), which can be adjusted by those skilled in the art according to an actual requirement as long as the first predetermined angel is smaller than the second predetermined angle. In other words, when the optical sensing module 186 senses the touch object excessively far away from the optical sensing module 186 itself (for example, located in the distant-excluded area A2), the optical sensing module 186 is not sensitive to a lateral movement of the touch point relative to the optical sensing module 186 on the touch plane 130.

It should be noticed that each set of the optical sensing modules of the present embodiment probably does not have the distant-excluded area but only has the near-excluded area. For example, the optical sensing modules 182, 184 located at the long sides of the touch plane 130 probably cannot find the distant point in the touch plane 130 since the distance point located at an intersection of two straight lines having the included angle θ2 with the side where the optical sensing modules 182 and 184 are located is generally located outside the touch plane 130. Therefore, the touch-excluded area corresponding to the optical sensing module at least includes the near-excluded area, and not necessarily includes the distant-excluded area. Those skilled in the art can also determine whether the touch coordinates data is in the distant-excluded area of each set of the optical sensing modules based on different sizes of the touch plane 130.

Figure 5:
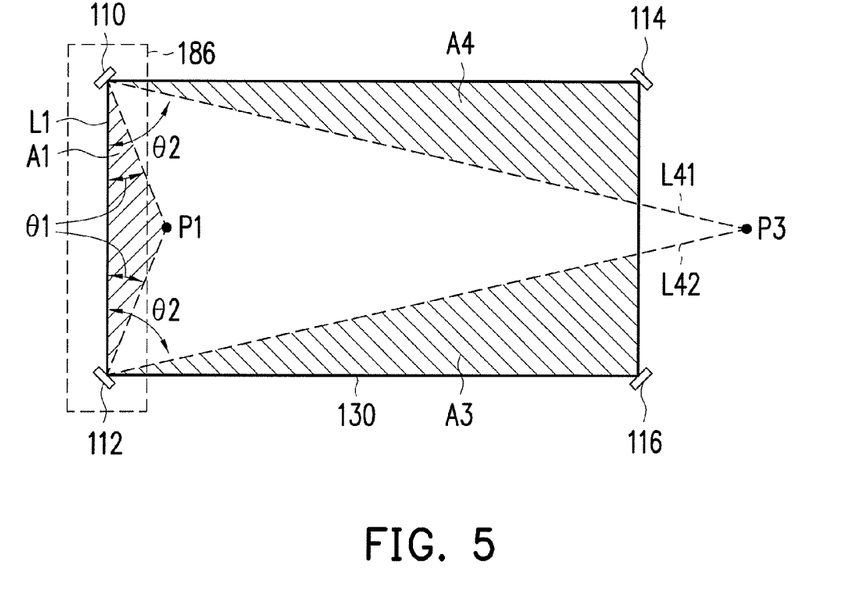
FIG. 5 is a schematic diagram of a near-excluded area A1 and distant-excluded areas A3, A4 corresponding to the optical sensing module 186 on the touch plane according to another embodiment of the invention.

In other embodiments, the distant-excluded area can also be defined in other forms. FIG. 5 is a schematic diagram of a near-excluded area A1 and distant-excluded areas A3, A4 corresponding to the optical sensing module 186 on the touch plane 130 according to another embodiment of the invention. Referring to FIG. 4, the near-excluded area A1 is the same to that of FIG. 4, and description thereof may refer to the related description of the aforementioned embodiment. In the present embodiment of the invention, the distant-excluded areas A3, A4 corresponding to the optical sensing module 186 are defined as a touch area outside an area encircled by the side L1 and two third connection lines L41 and L42 connected between the two optical sensors in the optical sensing module 186 and a distant point P3, i.e. the areas A3 and A4. Included angles θ2 respectively included between the side L1 and the third connection lines L41 and L42 are equal to the second predetermined angle (about 80 degrees), and the first predetermined angle is smaller than the second predetermined angle. Since the optical sensing module 186 is located at a short side of the rectangle, the more the touch coordinates data sensed by the optical sensing module 186 is close to the optical engine modules 114 and 116, the lower reliability the touch coordinates data has, and it more likely to have an error. Therefore, when the touch coordinates data sensed by the optical sensing module 186 is located in the areas A3 and A4, such touch coordinates data is neglected.

Referring back to FIG. 1 and FIG. 2, in the step S260, the calculation module 170 of the processing unit 120 calculates the touch coordinates of each touch object according to the remained touch coordinates data. In the present embodiment, the calculation module 170 also determines and calculates the real points and the ghost points. In some embodiments, the calculation module 170 can assign different weights to the touch coordinates data sensed by each of the optical sensing modules, such that calculation of the touch coordinates of the touch object can be more accurate. In the present embodiment, identification method of the real points and the ghost points and coordinates calculation method adopted by the calculation module 120 can be implemented by existing techniques or any exclusive special technique, which are not limited by the disclosed content of the invention. A purpose of the invention is to ensure that the optical touch device filters unreliable touch points (regardless of real points or ghost points) in advance, so as to simplify a calculation procedure of multi-touch.

In summary, the optical touch device of the invention senses the touch object through a plurality sets of the optical sensing modules composed of a plurality of paired optical sensors, and the touch-excluded area with lower reliability is set according to a position of each set of the optical sensing modules. When the coordinates data generated by each set of the optical sensing modules is in the touch-excluded area with lower reliability, the coordinates data is excluded. Since the optical touch device has a plurality sets of optical sensing modules, data of each set of the optical sensing modules with lower reliability can be directly decreased, so as to simplify a determination process of the touch points, by which the coordinates data with lower reliability is not considered for determining the touch points, so as to increase determination accuracy.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical touch device, comprising:
    a plurality of optical sensors, arranged around a touch plane and spaced from each other, the optical sensors respectively generating a plurality of optical touch data according to at least one touch object on the touch plane, wherein the two adjacent optical sensors located at one side of the touch plane are defined as one set of an optical sensing module, such that the optical sensors are paired to form multiple sets of the optical sensing modules; and
    a processing unit, coupled to the optical sensors,
    wherein the processing unit obtains the optical touch data corresponding to the optical sensors, and generates a plurality of touch coordinates data corresponding to the plurality sets of the optical sensing modules according to the optical touch data, and determines whether the touch coordinates data corresponding to each set of the optical sensing modules is in at least one touch-excluded area corresponding to each set of the optical sensing modules, wherein the at least one touch-excluded area is located in the touch plane, and the at least one touch-excluded area corresponding to each set of the optical sensing modules comprises a near-excluded area, wherein the near-excluded area is defined as an area encircled by the side of the touch plane where the corresponding set of the optical sensing module is located, a first connection line, and a second connection line,
        wherein the first connection line is a line connected between a first optical sensor in the corresponding set of the optical sensing module and a near point on the touch plane, and an included angle between the side and the first connection line is equal to a first predetermined angle,
        wherein the second connection line is a line connected between a second optical sensor in the corresponding set of the optical sensing module and the near point on the touch plane, and an included angle between the side and the second connection line is equal to the first predetermined angle,
    wherein the processing unit respectively excludes the touch coordinates data in the at least one touch-excluded area corresponding to each set of the optical sensing modules, and calculates touch coordinates of the at least one touch object according to the remained touch coordinates data.

2. The optical touch device as claimed in claim 1, further comprising:
    a plurality of light sources, respectively disposed beside the optical sensors to generate lights.

3. The optical touch device as claimed in claim 1, wherein the at least one touch-excluded area corresponding to each set of the optical sensing module further comprises a distant-excluded area,
    wherein the distant-excluded area is defined as an area encircled by a third connection line, a fourth connection line, and another side opposite to the side where the set of the optical sensing module corresponding to the near-excluded area is located,
    wherein the third connection line is a line extended from first optical sensor and a distant point on the touch plane, and an included angle between the side and the third connection line is equal to a second predetermined angle,
    wherein the fourth connection line is a line extended from the second optical sensor and the distance point on the touch plane, and an included angle between the side and the fourth connection line is equal to the second predetermined angle, and wherein
    the first predetermined angle is smaller than the second predetermined angle.

4. The optical touch device as claimed in claim 1, wherein the at least one touch-excluded area corresponding to the set of the optical sensing module further comprises a distant-excluded area,
    wherein the distant-excluded area is defined as the touch area outside an area encircled by the side and two third connection lines respectively connected between the two optical sensors and a distant point,
    wherein an included angle between the side and the third connection line is equal to a second predetermined angle, and the first predetermined angle is smaller than the second predetermined angle.

5. The optical touch device as claimed in claim 1, wherein the processing unit comprises:
    an image capturing module, coupled to the optical sensors, and obtaining the optical touch data corresponding to the optical sensors;
    a pairing processing module, coupled to the image capturing module, and calculating the touch coordinates data corresponding to each set of the optical sensing modules according to the optical touch data corresponding to the optical sensors in the sets of the optical sensing modules;
    a filtering module, coupled to the pairing processing module, and determining whether the touch coordinates data corresponding to each set of the optical sensing modules is in at least one touch-excluded area corresponding to each set of the optical sensing modules, and respectively excluding the touch coordinates data in the at least one touch-excluded area corresponding to each set of the optical sensing modules; and
    a calculation module, coupled to the filtering module, and calculating touch coordinates of the at least one touch object according to the remained touch coordinates data.

6. The optical touch device as claimed in claim 1, wherein the touch plane is a rectangle, and the number of the optical sensors is equal to four and the optical sensors are located at four corners of the rectangle.

7. An optical touch sensing method, comprising:
providing a plurality of optical sensors, wherein the optical sensors are arranged around a touch plane and are spaced from each other, and the two adjacent optical sensors located at one side of the touch plane are defined as one set of an optical sensing module, such that the optical sensors are paired to form multiple sets of the optical sensing modules;
obtaining a plurality of optical touch data corresponding to the optical sensors, wherein the optical sensors respectively generate the corresponding optical touch data according to at least one touch object on the touch plane;
generating a plurality of touch coordinates data corresponding to the plurality sets of the optical sensing modules according to the optical touch data;
determining whether the touch coordinates data corresponding to each set of the optical sensing modules is in at least one touch-excluded area corresponding to each set of the optical sensing modules, comprising:
determining whether the touch coordinates data corresponding to the set of the optical sensing module is located in a near-excluded area of the touch plane, wherein the near-excluded area is defined as an area encircled by the side of the touch plane where the corresponding set of the optical sensing module is located, a first connection line, and a second connection line, wherein:
the first connection line is a line connected between a first optical sensor in the corresponding set of the optical sensing module and a near point on the touch plane, and an included angle between the side and the first connection line is equal to a first predetermined angle, and
the second connection line is a line connected between a second optical sensor in the corresponding set of the optical sensing module and the near point on the touch plane, and an included angle between the side and the second connection line is equal to the first predetermined angle;
excluding the touch coordinates data in the at least one touch-excluded area corresponding to each set of the optical sensing modules; and
calculating touch coordinates of the at least one touch object according to the remained touch coordinates data.

8. The optical touch sensing method as claimed in claim 7, wherein the step of determining whether the touch coordinates data corresponding to each set of the optical sensing modules is in the at least one touch-excluded area corresponding to each set of the optical sensing modules further comprises:
determining whether the touch coordinates data corresponding to the set of the optical sensing module is located in a distant-excluded area of the touch plane, wherein the distant-excluded area is defined as an area encircled by a third connection line, a fourth connection line, and another side of the touch plane opposite to the side where the set of the optical sensing module corresponding to the near-excluded area is located, wherein the third connection line is a line extended from first optical sensor and a distant point on the touch plane, and an included angle between the side and the third connection line is equal to a second predetermined angle, wherein the fourth connection line is a line extended from the second optical sensor and the distance point on the touch plane, and an included angle between the side and the fourth connection line is equal to the second predetermined angle, and wherein the first predetermined angle is smaller than the second predetermined angle.

9. The optical touch sensing method as claimed in claim 8, wherein the first predetermined angle and the second predetermined angle are set according to a resolution of each of the optical sensing modules.

10. The optical touch sensing method as claimed in claim 8, wherein the first predetermined angle and the second predetermined angle are set according to an angle of view of each of the optical sensing modules.

11. The optical touch sensing method as claimed in claim 7, wherein the step of determining whether the touch coordinates data corresponding to each set of the optical sensing modules is in the at least one touch-excluded area corresponding to each set of the optical sensing modules comprises:
determining whether the touch coordinates data corresponding to the set of the optical sensing module is located in a distant-excluded area of the touch plane, wherein the distant-excluded area is defined as the touch area outside an area encircled by the side and two third connection lines respectively connected between the two optical sensors and a distant point, wherein an included angle between the side and the third connection line is equal to a second predetermined angle, and the first predetermined angle is smaller than the second predetermined angle.

12. An optical touch device, comprising:
a plurality of optical sensors, arranged around a touch plane and spaced from each other, the optical sensors respectively generating a plurality of optical touch data according to at least one touch object on the touch plane, wherein the two adjacent optical sensors located at one side of the touch plane are defined as one set of an optical sensing module, such that the optical sensors are paired to form multiple sets of the optical sensing modules; and
a processing unit, coupled to the optical sensors,
wherein the processing unit obtains the optical touch data corresponding to the optical sensors, and generates a plurality of touch coordinates data corresponding to the plurality sets of the optical sensing modules according to the optical touch data, and determines whether the touch coordinates data corresponding to each set of the optical sensing modules is in at least one touch-excluded area corresponding to each set of the optical sensing modules, wherein the at least one touch-excluded area is located in the touch plane, and the at least one touch-excluded area corresponding to each set of the optical sensing modules comprises a near-excluded area and a distant-excluded area, wherein the near-excluded area is defined as an area encircled by the side of the touch plane where the corresponding set of the optical sensing module is located, a first connection line, and a second connection line, wherein the distant-excluded area is defined as an area encircled by a third connection line, a fourth connection line, and another side opposite to the side where the set of the optical sensing module corresponding to the near-excluded area is located, wherein the first connection line is a line connected between a first optical sensor in the corresponding set of the optical sensing module and a near point on the touch plane, and an included angle between the side and the first connection line is equal to a first predetermined angle, wherein the second connection line is a line connected between a second optical sensor in the corresponding set of the optical sensing module and the near point on the touch plane, and an included angle between the side and the second connection line is equal to the first predetermined angle, wherein the third connection line is a line extended from first optical sensor and a distant point on the touch plane, and an included angle between the side and the third connection line is equal to a second predetermined angle, wherein the fourth connection line is a line extended from the second optical sensor and the distance point on the touch plane, and an included angle between the side and the fourth connection line is equal to the second predetermined angle, wherein the first predetermined angle is smaller than the second predetermined angle, and wherein the processing unit respectively excludes the touch coordinates data in the at least one touch-excluded area corresponding to each set of the optical sensing modules, and calculates touch coordinates of the at least one touch object according to the remained touch coordinates data.

* * * * *